(12) United States Patent
Fukui

(10) Patent No.: US 7,273,259 B2
(45) Date of Patent: *Sep. 25, 2007

(54) BICYCLE HUB ASSEMBLY

(75) Inventor: Seiji Fukui, Shimonoseki (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/438,214

(22) Filed: May 23, 2006

(65) Prior Publication Data

US 2006/0208561 A1    Sep. 21, 2006

Related U.S. Application Data

(62) Division of application No. 10/884,164, filed on Jul. 6, 2004.

(51) Int. Cl.
*B60B 27/00* (2006.01)

(52) U.S. Cl. .................... 301/110.5; 301/108.5

(58) Field of Classification Search ............. 301/2.5, 301/59, 110.5, 110.6, 37.41, 108.1, 108.4, 301/108.5

See application file for complete search history.

(56) References Cited

U.S. PATENT DOCUMENTS

| | | | |
|---|---|---|---|
| 280,633 A * | 7/1883 | Latta | 301/59 |
| 726,103 A | 4/1903 | Schact | |
| 726,557 A | 4/1903 | Mesnard | |
| 1,119,403 A | 12/1914 | Cooper | |
| 1,373,707 A | 4/1921 | Bennett | |
| 2,179,418 A * | 11/1939 | McDonald | 310/75 R |
| 2,630,020 A | 3/1953 | Juy | |
| 3,722,959 A | 3/1973 | Carbon et al. | |
| 4,049,319 A * | 9/1977 | Hartung | 301/1 |
| 4,138,132 A | 2/1979 | Doyle | |
| 4,424,981 A | 1/1984 | Maxwell | |
| D295,396 S | 4/1988 | Rudd et al. | |
| 4,878,558 A | 11/1989 | Asakura | |
| 4,944,340 A | 7/1990 | Tortorich | |
| 4,966,419 A | 10/1990 | Cunard | |
| D313,774 S | 1/1991 | Hauer | |
| 5,782,540 A | 7/1998 | Camfield et al. | |
| 5,795,036 A | 8/1998 | Campagnolo | |
| 5,924,715 A | 7/1999 | Norem | |
| 6,030,052 A * | 2/2000 | Watarai et al. | 301/110.5 |
| 6,068,349 A * | 5/2000 | Henderson et al. | 301/110.5 |
| D444,104 S | 6/2001 | Baker | |
| 6,605,884 B2 * | 8/2003 | Nishimoto | 310/67 A |
| 6,659,489 B2 * | 12/2003 | Masui et al. | 280/304.3 |
| 6,783,192 B2 | 8/2004 | Meggiolan | |
| 7,182,410 B2 * | 2/2007 | Fukui | 301/110.5 |
| 2006/0006732 A1 * | 1/2006 | Fukui | 301/110.5 |

* cited by examiner

FOREIGN PATENT DOCUMENTS

DE    298 01 930 U1    3/1998

*Primary Examiner*—Jason R. Bellinger
(74) *Attorney, Agent, or Firm*—Global IP Counselors, LLP

(57) ABSTRACT

A bicycle hub cover assembly is installed on a bicycle hub to provide a hard, rigid protective cover for the bicycle hub. In one embodiment, the bicycle hub cover assembly has a hub shell cover, a first hub end cover, a second hub end cover and a pair of fasteners that attach the hub end covers to the axle of the bicycle hub. The hub shell cover is configured and arranged to be mounted concentrically around a center portion of the hub shell of the bicycle hub, while the hub end covers overlie the axial ends of the bicycle hub. Thus, the bicycle hub is completely enclosed, except for a small gap located between the hub shell cover and each of the first and second hub end covers. In another embodiment, the hub shell cover is eliminated.

17 Claims, 13 Drawing Sheets

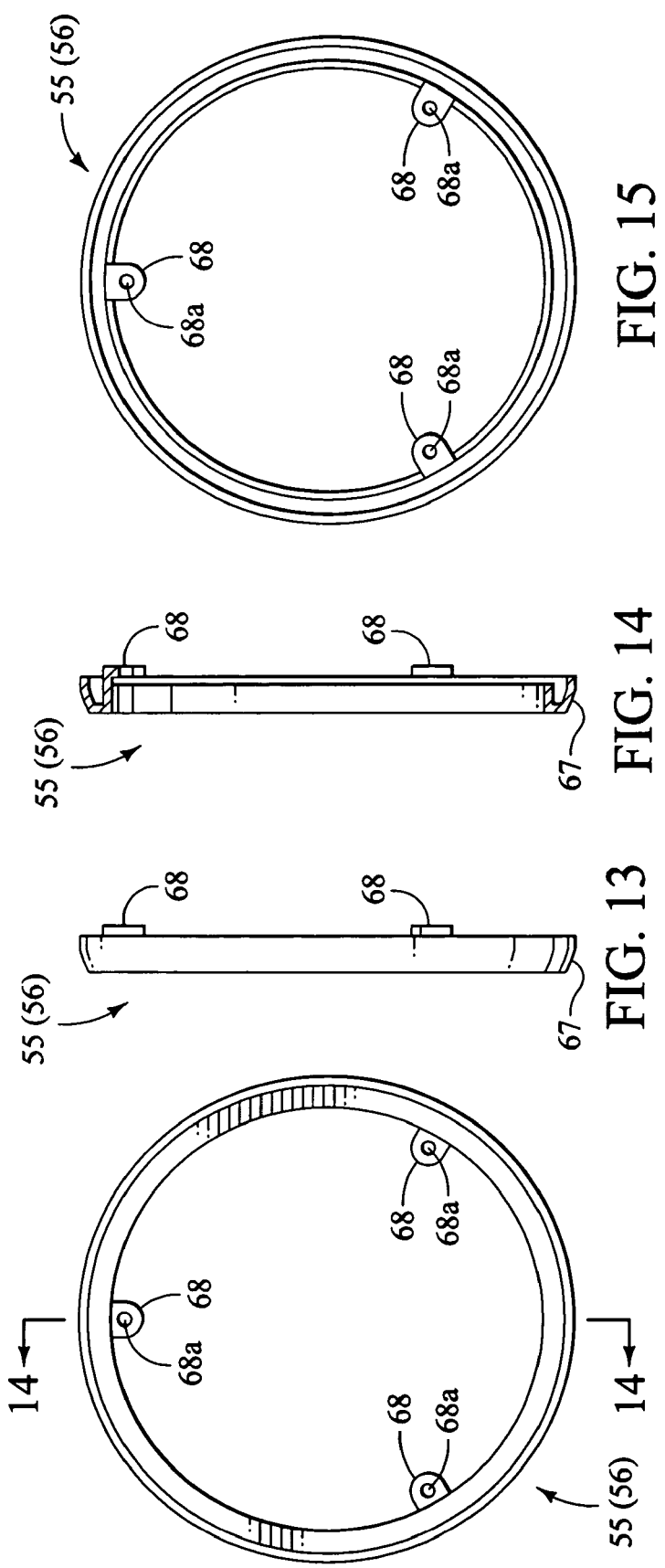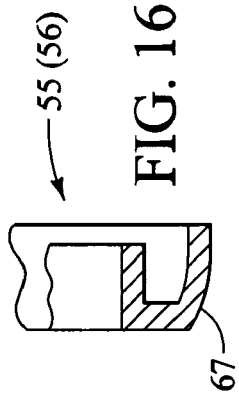

BICYCLE HUB ASSEMBLY

CROSS-REFERENCE TO RELATED APPLICATIONS

This application is a divisional application of U.S. patent application Ser. No. 10/884,164 filed on Jul. 6, 2004. The entire disclosure of U.S. patent application Ser. No. 10/884,164 is hereby incorporated herein by reference.

BACKGROUND OF THE INVENTION

1. Field of the Invention

This invention generally relates to a cover for a bicycle hub. More specifically, the present invention relates to a bicycle hub assembly in which at least one end of the hub axle is covered by a cover member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle to make the bicycle more reliable and durable. Moreover, various components of the bicycle are constantly being modified and/or improved depending upon their use to be more aesthetically pleasing to the rider. In other words, it is often desirable to produce bicycles that are attractive to the rider. In addition, many riders desire a bicycle that looks different than other bicycles. Many bicycle frames are designed to have a distinctive and attractive appearance.

Recently, various covers have been proposed for covering portions of the front fork and/or the front hub. For example, a cover assembly has been proposed in U.S. Pat. No. 6,659,489 (Shimano Inc.) that provides an aesthetically pleasing look and a protection to the front hub. Basically, this Shimano patent discloses a pair of hub covers that are used with fork tube covers to provide an attractive appearance. However, the hub covers are not integrated with the hub design, and do not protect the center portion of the hub shell. Thus, the cover assembly does not provide a hub assembly with a look in which the hub cover and the hub shell are integrated together with a unified identity.

Another example of a hub that includes a cover member to protect the hub is disclosed in U.S. Pat. No. 5,795,036 (Campagnolo). In this Campagnolo patent, a covering ring is provided at the end of the hub which is integrated with the hub shell such that the covering ring and the hub shell has a sense of identify with each other. However, one major drawback to this design is that the ends of the hub axle are not covered. Thus, the ends of the hub axle are not protected and the end of the ends of the hub axle may detract from the appearance of the overall look of the hub.

In view of the above, it will be apparent to those skilled in the art from this disclosure that there exists a need for an improved a bicycle hub cover assembly. This invention addresses this need in the art as well as other needs, which will become apparent to those skilled in the art from this disclosure.

SUMMARY OF THE INVENTION

One object of the present invention is to provide a bicycle hub cover assembly that protected an end of a bicycle hub.

An object of the present invention is to provide a bicycle hub cover assembly for a bicycle hub that has a sense of identify with a hub shell of the hub.

Another object of the present invention is to provide a hub cover assembly that is attached to hub axis to rotate therewith.

The foregoing objects can basically be attained by providing a bicycle hub assembly that comprises a first hub end cover, a bicycle hub and a first fastener. The first hub end cover has a first mounting hole. The bicycle hub has a hub axle and a hub shell mounted on the hub axle such that the hub shell rotates about the hub axle. The first fastener extends through the first mounting hole of the first hub end cover and attached to a first end of the hub axle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 12 is an outside elevational view of one of the side members of the hub shell cover in accordance with the first embodiment of the present invention;

FIG. 13 is a edge elevational view of the side member of the hub shell cover illustrated in FIG. 12;

FIG. 14 is a longitudinal cross-sectional view of the side member of the hub shell cover illustrated in FIGS. 12 and 14 as seen along section line 14-14 of FIG. 12;

FIG. 15 is an inside axial end elevational view of the side member of the hub shell cover shown in FIGS. 12-14;

FIG. 16 is an enlarged partial, cross-sectional view of the cross-sectional profile of the side member of the hub shell cover illustrated in FIGS. 12-15;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 2:
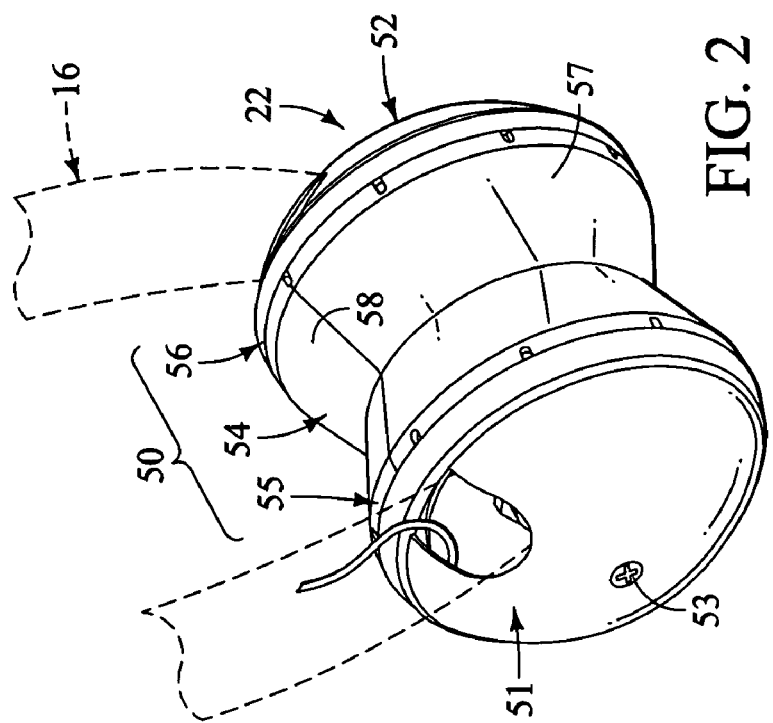
FIG. 2 is an enlarged perspective view of the front hub assembly in accordance with the first embodiment of the present invention, with the front fork or frame portion shown in phantom lines.
Figure 1:
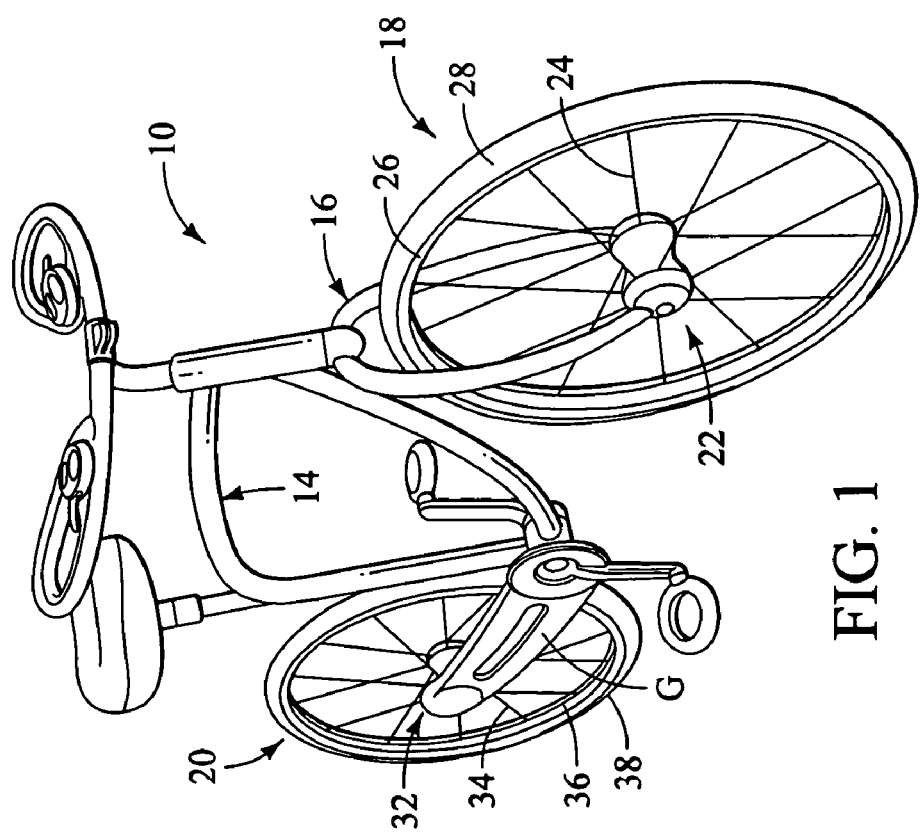
FIG. 1 is a perspective view of a bicycle that is equipped with front and rear bicycle hub assemblies in accordance with a first embodiment of the present invention.
Figure 4:
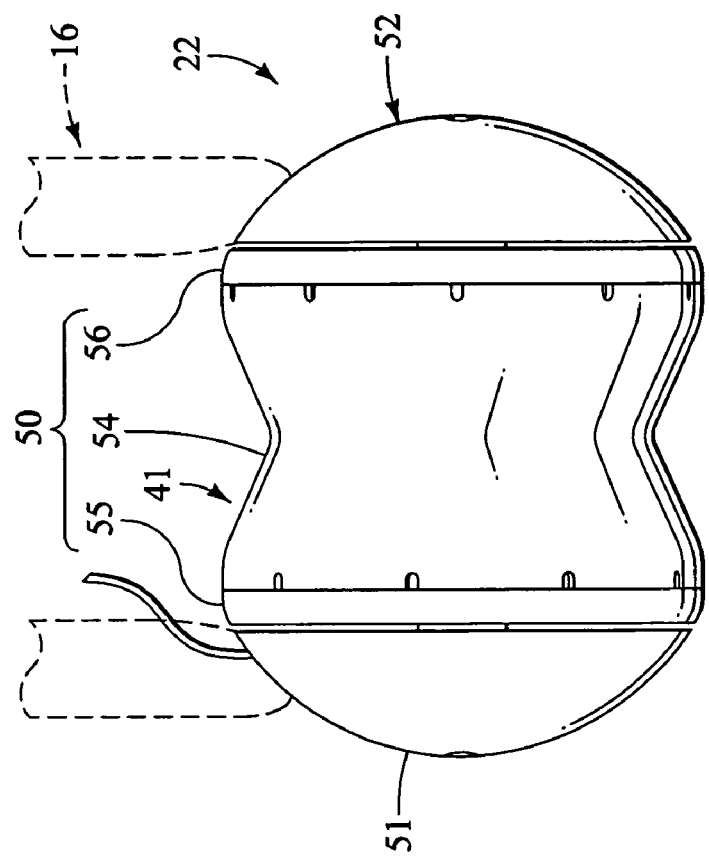
FIG. 4 is a front elevational view of the front bicycle hub assembly in accordance with the first embodiment of the present invention.
Figure 3:
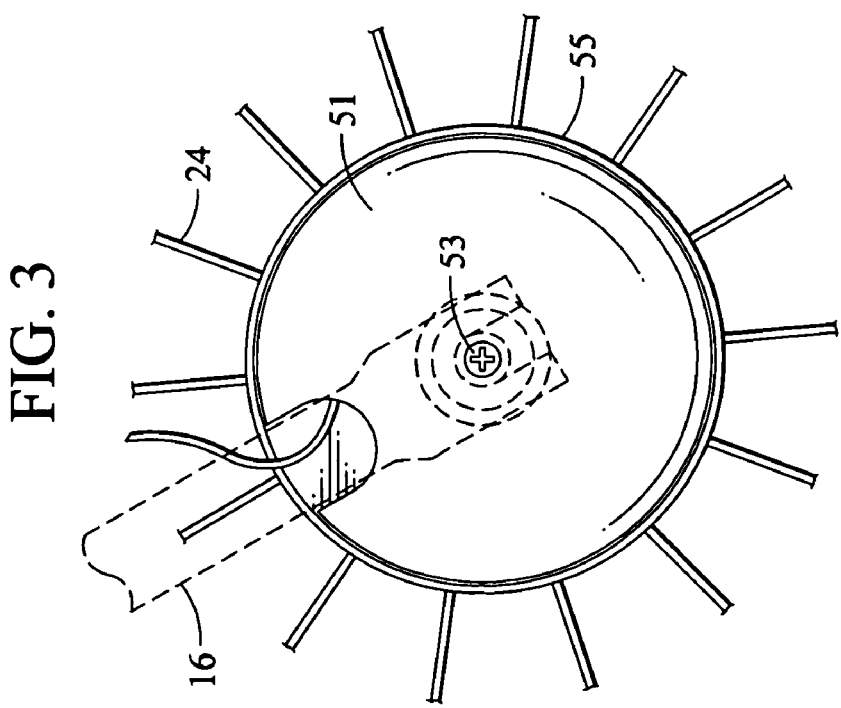
FIG. 3 is an axial end elevational view of the front hub assembly attached to the front hub in accordance with the first embodiment of the present invention.

Referring initially to FIG. 1, a bicycle 10 is illustrated that is equipped with a first embodiment of the present invention. Since these most of the parts of the bicycle 10 are well known in the art, only the parts of the bicycle 10 that relate to the present invention will be discussed or illustrated in detail. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The bicycle 10 basically has a frame 14 with a front fork or front frame portion 16 movably coupled thereto, a front wheel 18 and a rear wheel 20. The front and rear wheels 18 and 20 are rotatably mounted relative to the frame 14.

The front wheel 18 basically includes a front bicycle hub assembly 22, a plurality of spokes 24, a front rim 26 and a front tire 28. The inner ends of the spokes 24 are connected to the front bicycle hub assembly 22, while the outer ends of the spokes 24 are connected to the front rim 26 via spoke nipples (not shown). The structure of the front wheel 18 is basically conventional, except for the front bicycle hub assembly 22 as explained below.

The rear wheel 20 basically includes a rear bicycle hub assembly 32, a plurality of spokes 34, a rear rim 36 and a rear tire 38. The inner ends of the spokes 34 are connected to the rear bicycle hub assembly 32, while the outer ends of the spokes 34 are connected to the rear rim 36 via spoke nipples (not shown). The structure of the rear wheel 20 is basically conventional, except for the rear bicycle hub assembly 32 as explained below.

Figure 5:
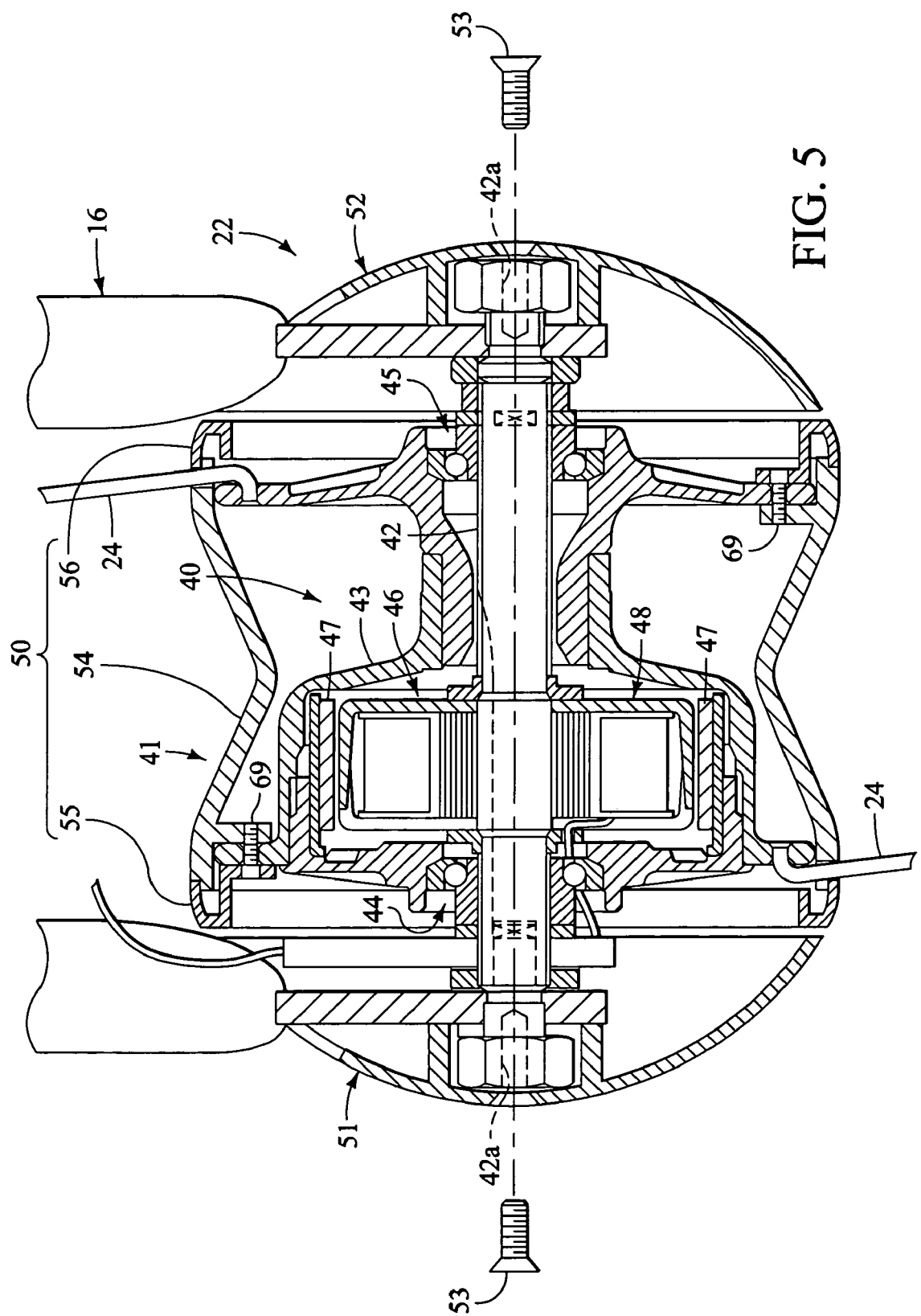
FIG. 5 is a longitudinal cross-sectional view of the front bicycle hub assembly in accordance with the first embodiment of the present invention.
Figure 6:
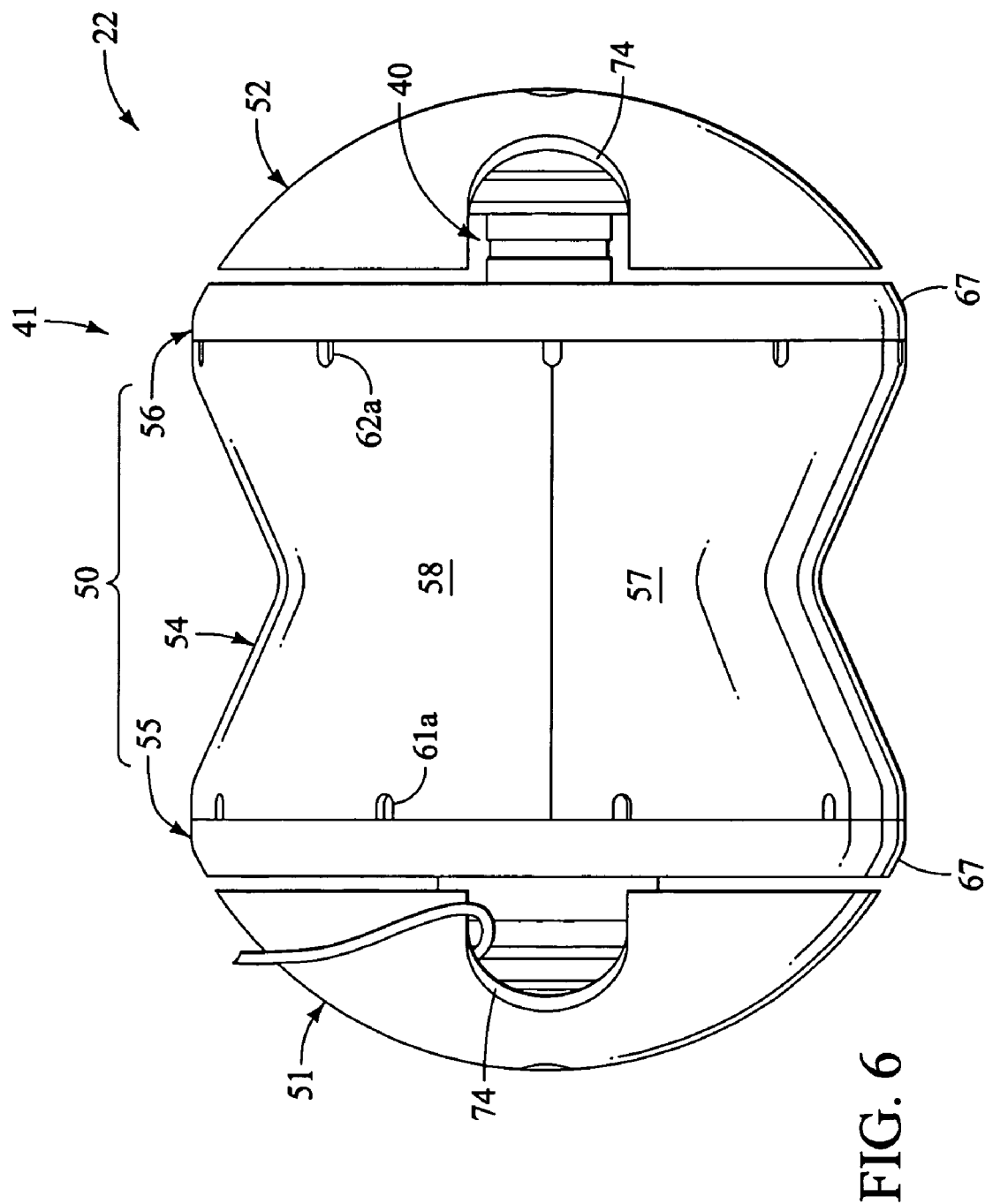
FIG. 6 is a top plan view of the bicycle hub in accordance with the first embodiment of the present invention.
Figure 9:
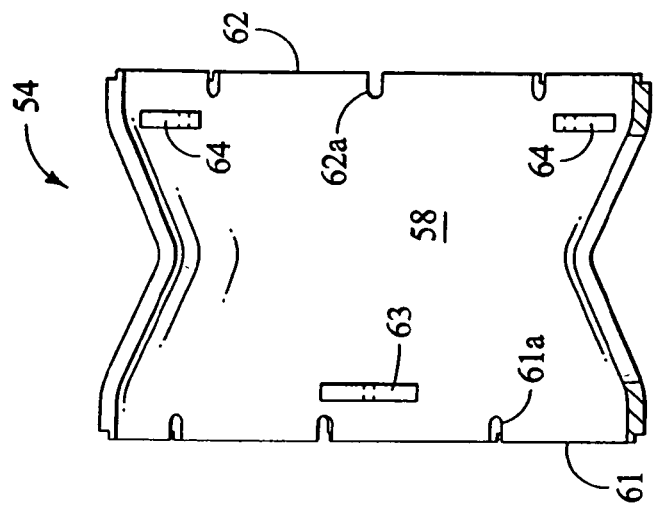
FIG. 9 is a longitudinal cross-sectional view of the center member of the hub shell cover illustrated in FIGS. 7 and 8 as seen along section line 9-9 of FIG. 8.
Figure 8:
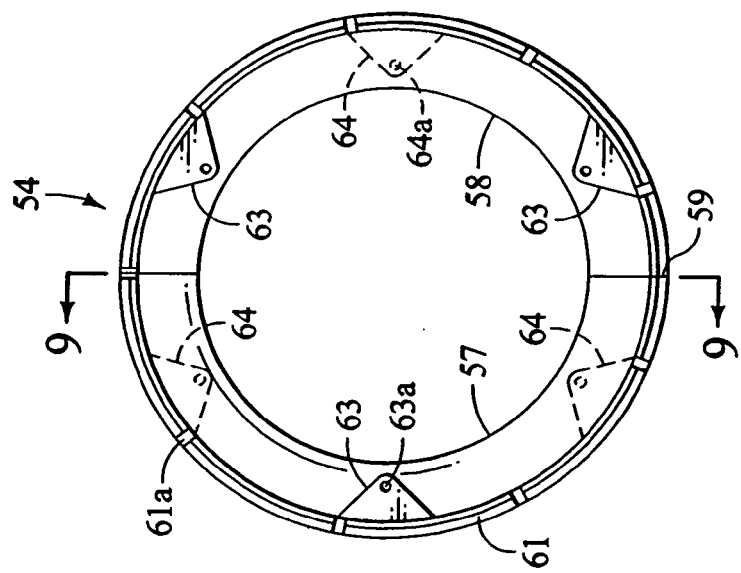
FIG. 8 is an axial end elevational view of the center member of the hub shell cover illustrated in FIG. 7.
Figure 7:
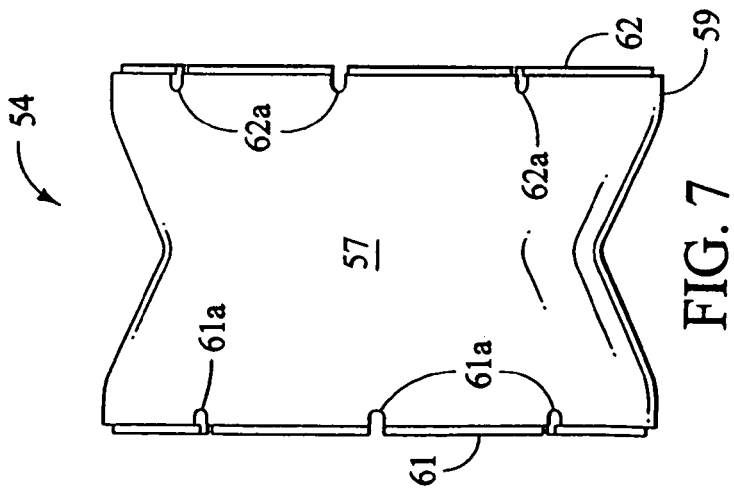
FIG. 7 is a front elevational view of the center section of the hub shell cover of the front bicycle hub assembly in accordance with the first embodiment of the present invention.
Figure 11:
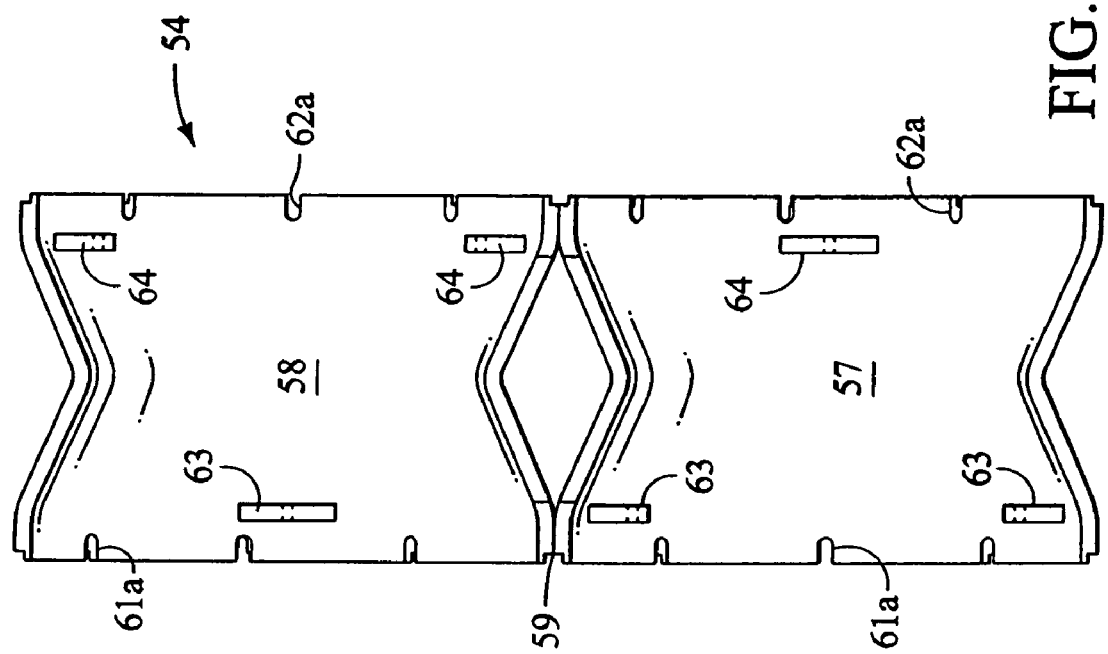
FIG. 11 is an inside elevational view of the center member of the hub shell cover illustrated in FIGS. 7-10 with the center member of the hub shell cover in its open position.
Figure 10:
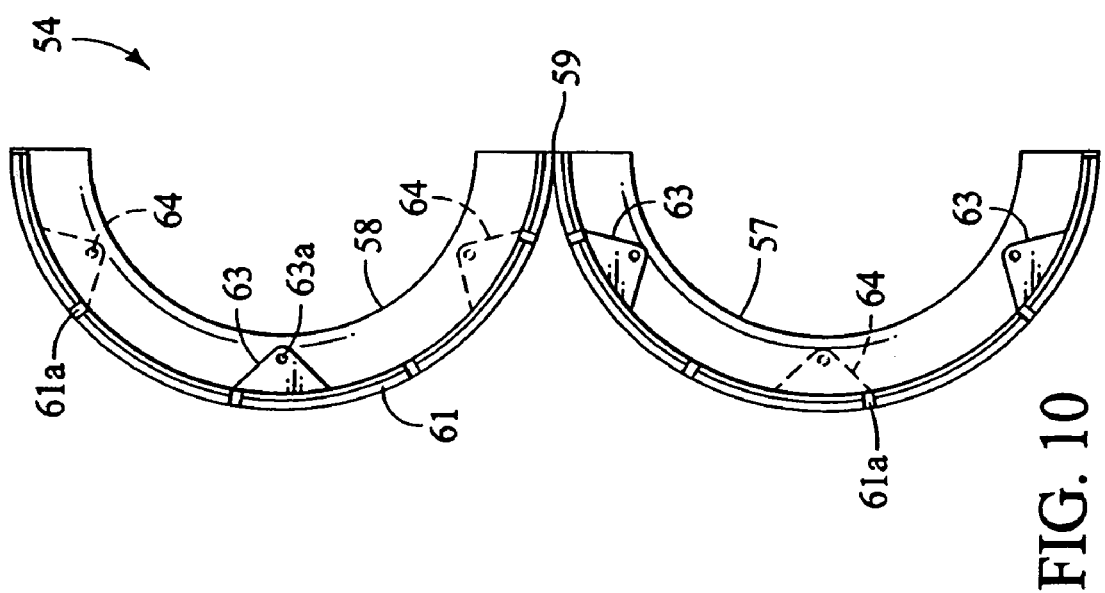
FIG. 10 is an axial end elevational view of the center member of the hub shell cover illustrated in FIGS. 7-9 with the center member of the hub shell cover in its open position.

As best seen in FIG. 5, the front bicycle hub assembly 22 basically includes a bicycle hub 40 and a bicycle hub cover assembly 41. The bicycle hub 40 in this embodiment is a conventional dynamo hub that has been slightly modified such that the bicycle hub cover assembly 41 can be mounted thereto. Thus, the follow description will mainly focus on the modifications of the bicycle hub 40 and the structure of the bicycle hub cover assembly 41.

The bicycle hub 40 basically includes a hub axle 42 and a hub shell 43 that is rotatably mounted on the hub axle 42 by a pair of bearing units 44 and 45 in a conventional manner. Each end of the hub axle 42 has an axially extending threaded hole 42a for attaching a part of the bicycle hub cover assembly 41 as explained below.

Preferably, the bicycle hub 40 also includes an internal electric generating mechanism or dynamo 46 disposed between the hub axle 42 and the hub shell 43. The dynamo 46 basically includes a plurality of permanent magnets 47 fixedly mounted to the hub shell 43 and a stator 48 fixedly mounted to the hub axle 42.

The bicycle hub cover assembly 41 basically includes a hub shell cover 50, a first hub end cover 51, a second hub end cover 52 and a pair of fasteners 53. The bicycle hub cover assembly 41 is illustrated as having a certain overall ornamental appearance, it will be apparent to those skilled in the art from this disclosure that various changes and modifications can be to the ornamental appearance without departing from the scope of the invention. Preferably, the bicycle hub cover assembly 41 can be installed without physically altering the bicycle frame 14. The hub shell cover 50 is configured and arranged to be mounted concentrically around the center portion of the hub shell 43, while the first and second hub end covers 51 and 52 overlie the axial ends of the hub axle 42 and the axial ends of the hub shell 43. Thus, the bicycle hub 40 is completely enclosed, except for a small gap located between the hub shell cover 50 and each of the first and second hub end covers 51 and 52.

As seen in FIGS. 2-5, the hub shell cover 50 basically includes a center member 54, a first side member 55 and a second side member 56. Preferably, the center member 54 of the hub shell cover 50 is constructed as a one-piece, unitary member from a lightweight, impact resistant material such as an acrylonitrile butadiene styrene (ABS) resin. Likewise, the side members 55 and 56 of the hub shell cover 50 are each constructed as a one-piece, unitary member from a lightweight, impact resistant material such as an acrylonitrile butadiene styrene (ABS) resin. Thus, the hub shell cover 50 provides a hard, rigid protective cover for the bicycle hub 40.

As seen in FIGS. 7-11, the center member 54 of the hub shell cover 50 is a tubular member that is configured and arranged to be longitudinally opened. While the center member 54 of the hub shell cover 50 is preferably constructed as a one-piece, unitary member, it will be apparent to those skilled in the art from this disclosure that the hub shell cover 50 can be constructed of two or more pieces, if needed an/or desired. The center member 54 of the hub shell cover 50 has a first cover portion 57 and a second cover portion 58 with the first and second cover portions 57 and 58 being connected by a living hinge 59 to form a clam shell configuration. Essentially, the first and second cover portions 57 and 58 are identical in overall configuration and form an outer peripheral surface with an hour glass shape when in the installed position.

The center member 54 of the hub shell cover 50 has a first free end edge 61 and a second free end edge 62. The first and second free end edges 61 and 62 are preferably step-shaped to join with the first and second side members 55 and 56, respectively, in an overlapping manner. The first and second free end edges 61 and 62 are preferably provided with a plurality of cutouts 61a and 62a, respectively, which form a plurality of first and second spoke openings for allowing the spokes 24 to extend from the hub shell 43 outwardly past the hub shell cover 50. Preferably, the inner surface of the center member 54 of the hub shell cover 50 is provided with a plurality of first mounting flanges 63 and a plurality of second mounting flanges 64. Preferably, the first mounting flanges 63 are located adjacent the first free end edge 61 and are circumferentially spaced equally apart about the inner periphery of the center member 54 of the hub shell cover 50. Likewise, the second mounting flanges 64 are located adjacent the second free end edge 62 of the center member 54 of the hub shell cover 50 and are circumferentially spaced equally apart. Preferably, the first and second mounting flanges 63 and 64 are equally spaced apart by approximately 120 degrees. In other words, there are preferably three first mounting flanges 63 and three second mounting flanges 64. Moreover, preferably the first mounting flanges 63 are out of phase with the second mounting flanges 64.

Referring now to FIGS. 12-16, the first and second side members 55 and 56 of the hub shell cover 50 are each ring-shaped members that mate with the first and second free end edges 61 and 62 of the center member 54 of the hub shell cover 50. Preferably, the outer peripheral surfaces of the first and second side members 55 and 56 are contiguous with the outer peripheral surface of the center member 54 such that the outer peripheral surfaces form a smooth transition therebetween without any abrupt changes. Of course, it will be apparent to those skilled in the art from this disclosure that the outer peripheral surfaces of the first and second side members 55 and 56 do not necessarily precisely match the outer peripheral surface of the center member 54. Therefore, the phrase "a smooth contiguous transition" as used herein refers to a transition that appears to be substantially contiguous without an abrupt change as viewed by the naked eye from three to five feet from the bicycle hub cover assembly 41. In other words, there should not be an abrupt change that is more than the thickness of the material of the center member 54.

The first and second side members 55 and 56 have a substantially C-shaped cross-sectional profile as seen in FIG. 16. This C-shaped cross-sectional profile allows the first and second side members 55 and 56 to overlap the step shape of the first and second free end edges 61 and 62 of the center member 54. The outer peripheral surface of the first and second side members 55 and 56 preferably include a partially spherical portion 67 that has a curvature that matches the first and second hub end covers 51 and 52. Thus, when the first and second hub end covers 51 and 52 are installed on the hub axle 42 via the fasteners 53 the outer peripheral surfaces of the hub end covers 51 and 52 substantially match the spherical surface 67 of the first and second side members 55 and 56 of the hub shell cover 50. Thus, an integrated look is provided between the hub shell cover 50 and the first and second hub end covers 51 and 52.

Preferably, the first and second side members 55 and 56 are provided with three mounting flanges 68 that are circumferentially spaced apart to match the mounting flanges 63 and 64 of the center member 54. In other words, in the illustrated embodiment, the first and second side members 55 and 56 are provided with three mounting flanges 68 that are spaced 120 degrees apart about the inner peripheral edge of the first and second side members 55 and 56. The mounting flanges 68 are provided with mounting holes 68a that receive a fastener 69 for coupling the first and second side members 55 and 56 to the center member 54. More particularly, the fasteners 69 are preferably a self-tapping screw that is threaded into the holes 68a of the first and second side members 55 and 56 and then pass through a hole in the hub shell 43 and threaded into the holes 63a and 64a of the first and second mounting flanges 63 and 64 of the center member 54. In the illustrated embodiment, the center member 54 is first installed around the hub shell 43 such that the cutouts 61a and 62a receive the spokes 24. Accordingly, the center member 54 of the hub shell cover 50 is maintained in its closed position by the spokes 24 engaging the cutouts 61a and 62a. Next, the first and second side members 55 and 56 are installed on the free end edges 61 and 62 of the center member 54. Now, the fasteners 69 are installed to connect the mounting flanges 68 to the first and second mounting flanges 63 and 64 of the center member 54. Thus, the center member 54 and the first and second side members 55 and 56 are secured together about the hub shell 43.

Figure 19:
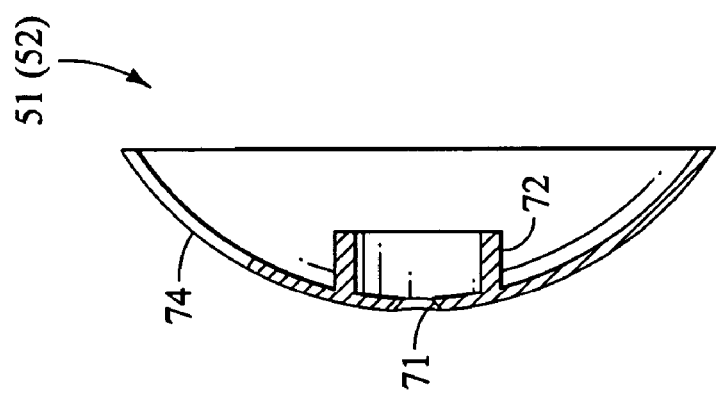
FIG. 19 is a cross-sectional view of the hub end cover illustrated in FIGS. 17 and 18 as seen along section line 19-19 of FIG. 17.
Figure 18:
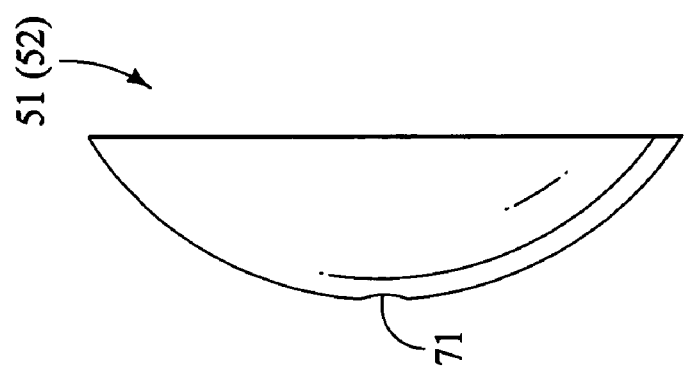
FIG. 18 is a side elevational view of the hub end cover illustrated in FIG. 17 in accordance with the present invention.
Figure 17:
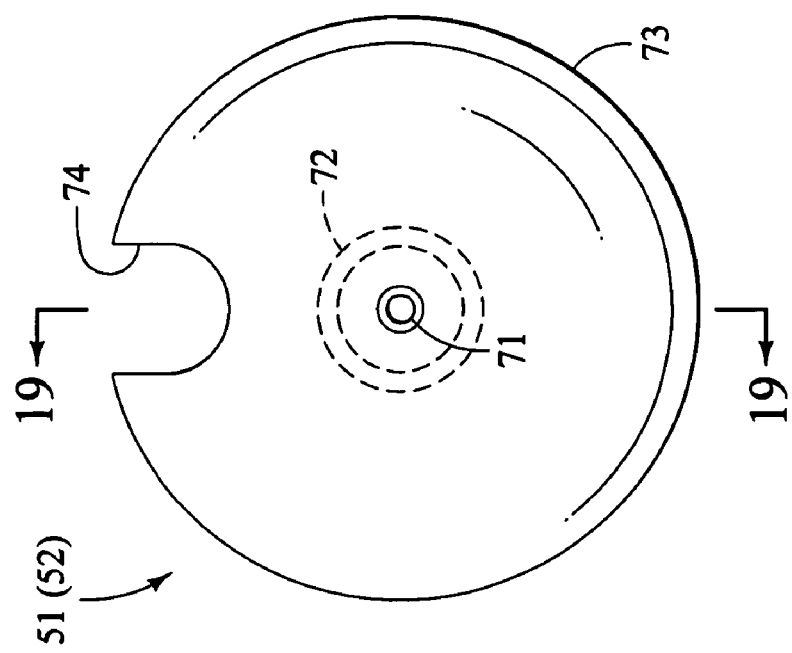
FIG. 17 is an outside end elevational view of one of the hub end covers in accordance with the first embodiment of the present invention.

As seen in FIGS. 17-19, the first and second hub end covers 51 and 52 are each bowl shaped members. Since the first and second hub end covers 51 and 52 are each identical, the same reference numbers will be used for describing the first and second hub end covers 51 and 52. The first and second hub end covers 51 and 52 are each constructed as a one-piece, unitary member from a lightweight, impact resistant material such as an acrylonitrile butadiene styrene (ABS) resin. Thus, the bicycle hub cover assembly 41 provides a hard, rigid protective cover for the bicycle hub 40.

The first and second hub end covers 51 and 52 have a centrally located mounting hole 71 that receives the fastener 53 for attaching the first and second hub end covers 51 and 52 to the hub axle 42. In particular, the fasteners 53 are preferably screws that are inserted through the mounting holes 71 of the first and second hub end covers 51 and 52, and then are threaded into the threaded holes 42a formed at the free ends of the hub axle 42.

Each of the first and second hub end covers 51 and 52 are also preferably provided with an axially extending abutment wall 72 that is circumferentially arranged about the mounting hole 71. Thus, the abutment wall 72 is disposed radially outwardly of the mounting hole 71. The abutment wall 72 is sized for accommodating the end of the hub axle 42. Also, the abutment wall 72 is configured to engage the end of the front fork 16 to provide the desired gap or spacing between the hub end covers 51 and 52 and the side members 55 and 56. The first and second hub end covers 51 and 52 have a peripheral edge 73 that is substantially circular, except for a frame receiving opening or notch 74 formed therein. In other words, the peripheral edges 73 of the first and second hub end covers 51 and 52 match the free end edges of the first and second side members 55 and 56 when the bicycle hub cover assembly 41 is installed on the bicycle hub 40.

Figure 21:
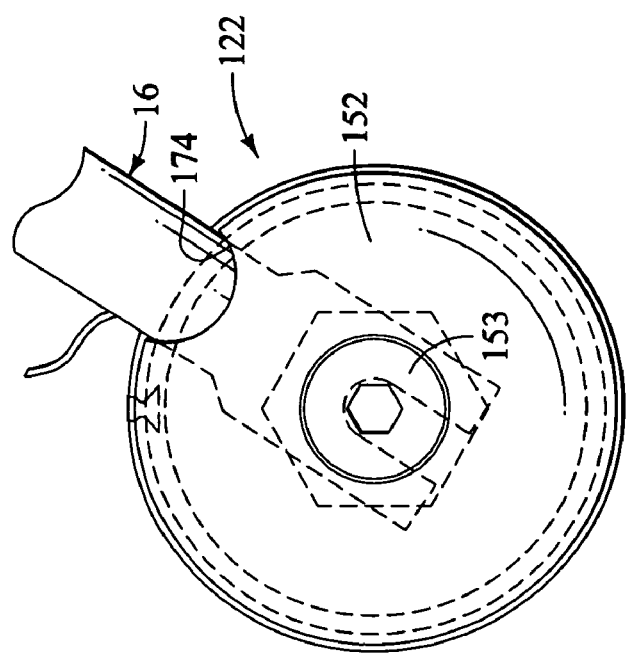
FIG. 21 is a side end elevational view of the bicycle hub assembly illustrated in FIG. 20 in accordance with the second embodiment of the present invention.
Figure 20:
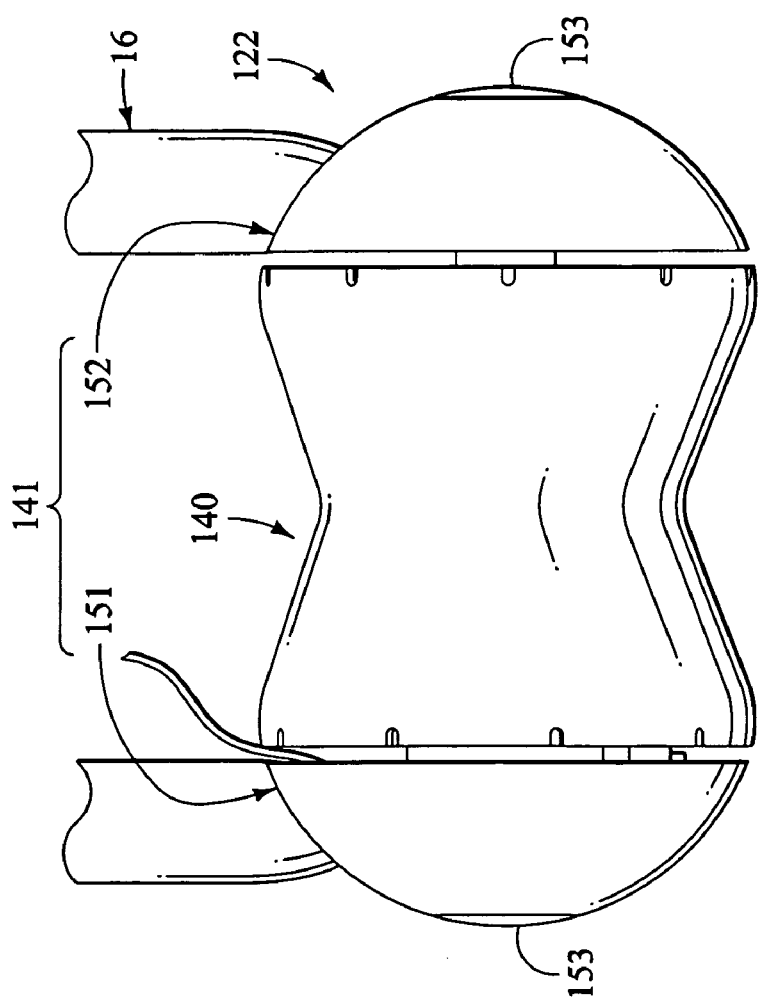
FIG. 20 is a front end elevational view of a front hub assembly in accordance with a second embodiment of the present invention.
Figure 22:
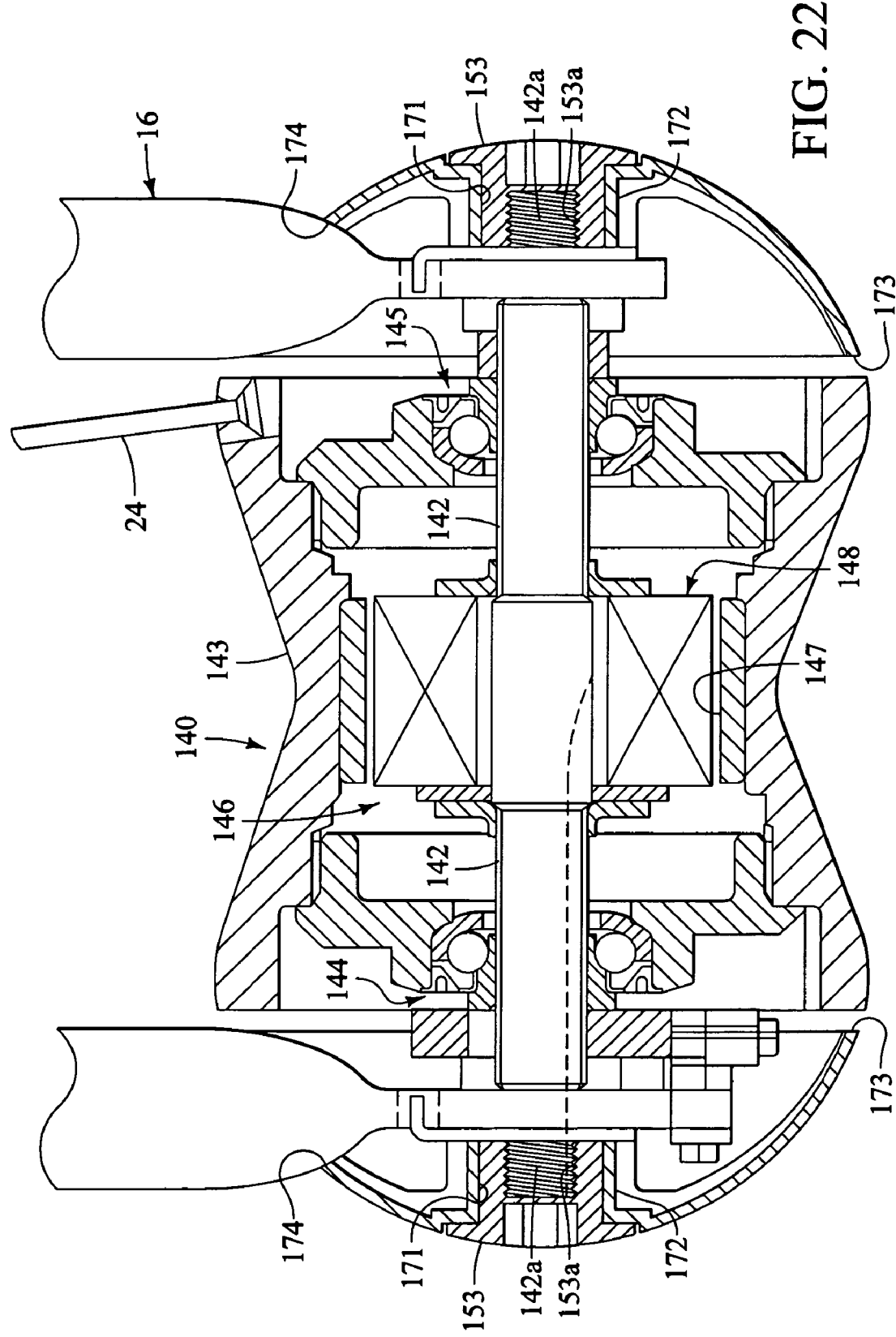
FIG. 22 is a longitudinal cross-sectional view of the hub assembly illustrated in FIGS. 20 and 21 in accordance with the second embodiment of the present invention.
Figure 23:
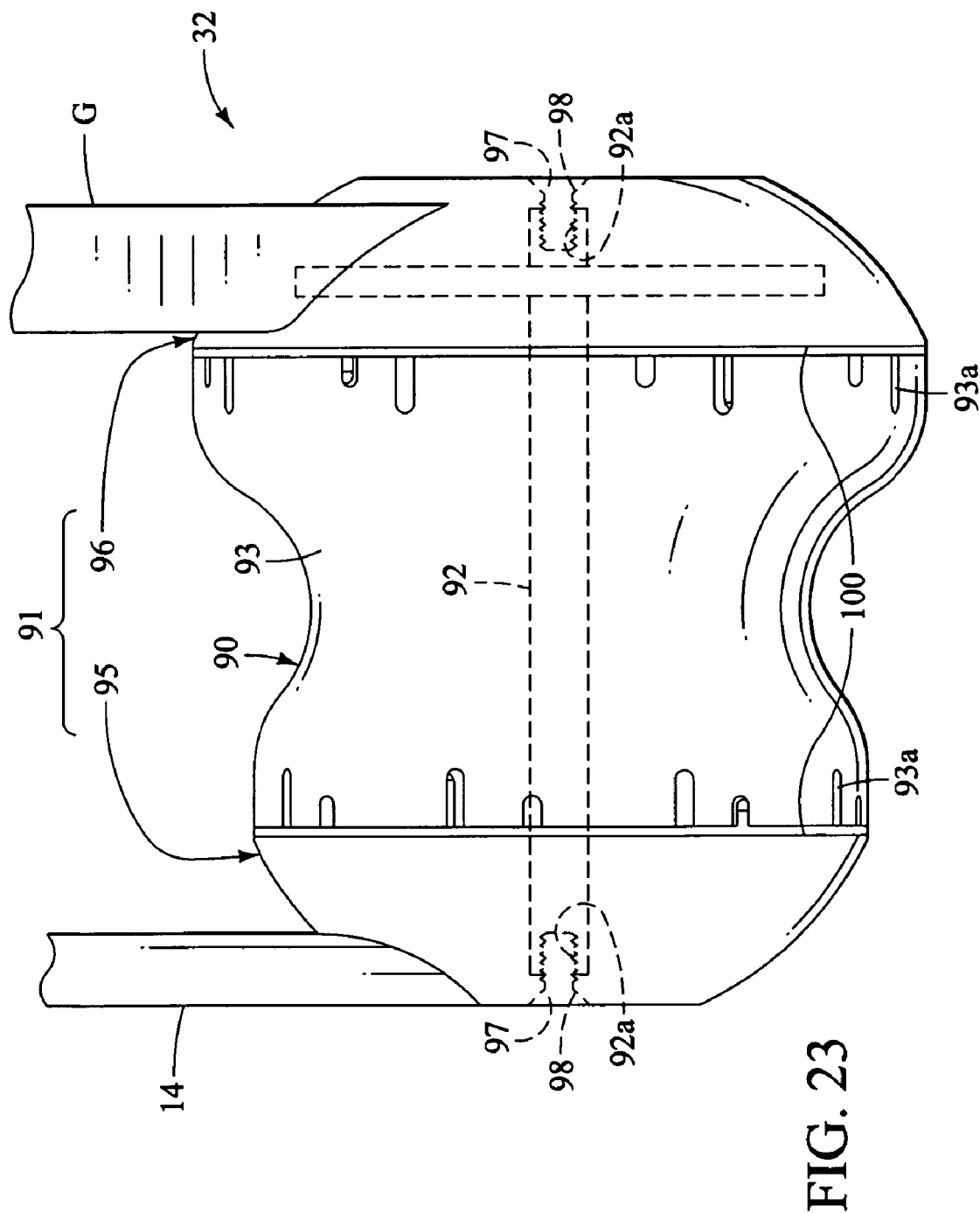
FIG. 23 is a front elevational view of a rear bicycle hub in accordance with the present invention.
Figure 25:
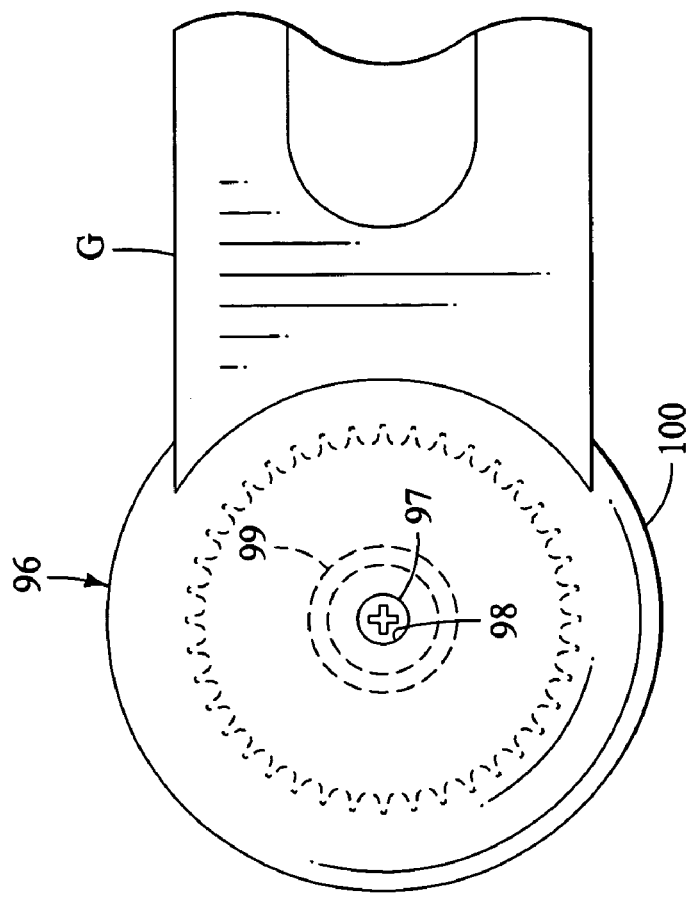
FIG. 25 is an end elevational view of the second side of the rear hub assembly illustrated in FIGS. 23 and 24.
Figure 24:
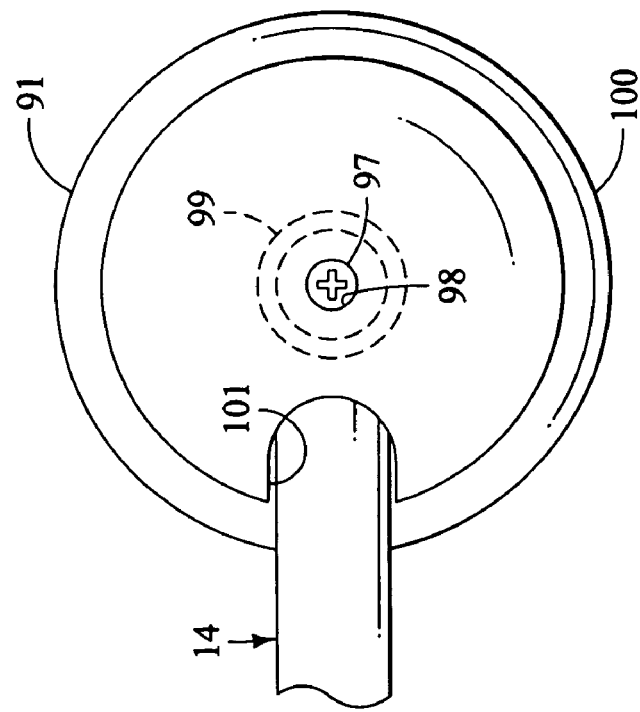
FIG. 24 is an end elevational view of a first side of the rear hub assembly illustrated in FIG. 22.
Figure 28:
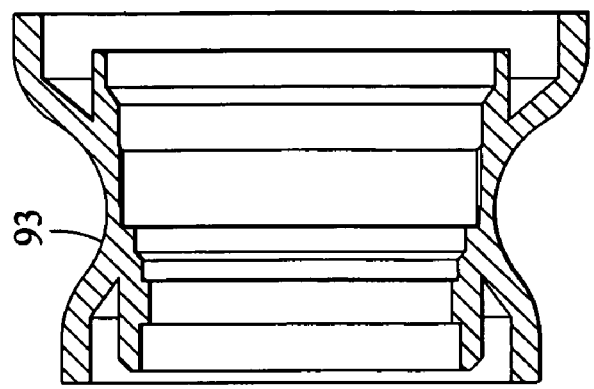
FIG. 28 is a longitudinal cross-sectional view of the rear hub shell illustrated in FIGS. 26 and 27 as seen along section line 28-28 of FIG. 26.
Figure 27:
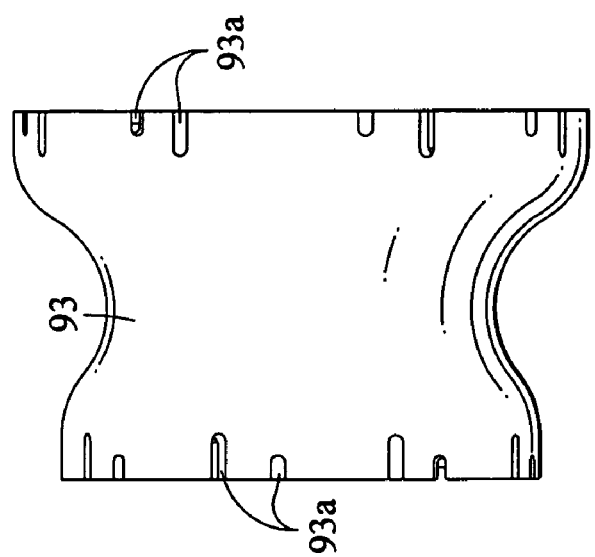
FIG. 27 is a side elevational view of the hub shell of the rear hub assembly illustrated in FIGS. 23-25.
Figure 26:
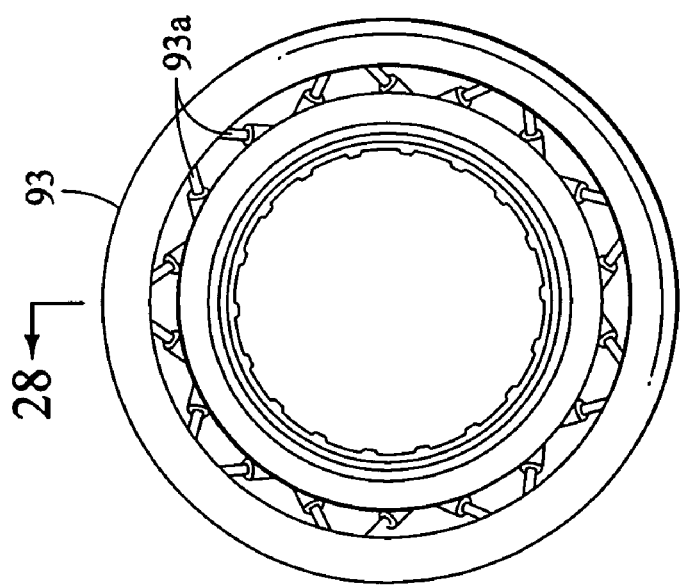
FIG. 26 is an end elevational view of the hub shell of the rear hub assembly illustrated in FIGS. 23-25.

Referring now to FIGS. 20-22, a modified front bicycle hub assembly 122 is illustrated in accordance with the present invention. In view of the similarity between the front bicycle hub assembly 22 and the front bicycle hub assembly 122, the parts of the front bicycle hub assembly 122 that are identical or substantially identical to the parts of the front bicycle hub assembly 22 will be only briefly described for the sake of brevity.

As seen in FIGS. 20 and 22, the front bicycle hub assembly 122 basically includes a bicycle hub 140 and a bicycle hub cover assembly 141. In this embodiment, the hub shell cover has been eliminated from the bicycle hub cover assembly 141. More specifically, as seen in FIG. 22, the bicycle hub 140 basically includes a hub axle 142 and a hub shell 143 that is rotatably mounted on the hub axle 142 by a pair of bearing units 144 and 145 in a conventional manner. The hub shell 143 has an outer peripheral surface that matches the outer peripheral surface of the hub shell cover 50 of the prior embodiment. Thus, this embodiment does not utilize a hub shell cover 50. In other words, the bicycle hub cover assembly 41 merely includes first and second hub end cover 151 and 152 that are attached to the hub axle 142 via a pair of fasteners 153. In particular, each end of the hub axle 142 has an externally threaded end portion 142a that threadedly engages internal threads of one of the fasteners 153.

Preferably, similar to the first embodiment, the bicycle hub 140 also includes an internal electric generating mechanism or dynamo 146 disposed between the hub axle 142 and the hub shell 143. The hub dynamo 146 basically includes a plurality of permanent magnet 147 fixedly mounted to the hub shell 143 and a stator 148 fixedly mounted to the hub axle 142.

The first and second hub end covers 151 and 152 are each bowl shaped members. Since the first and second hub end covers 151 and 152 are each identical, the same reference numbers will be used for describing the first and second hub end covers 151 and 152. The first and second hub end covers 151 and 152 are each constructed as a one-piece, unitary member from a lightweight, impact resistant material such as an acrylonitrile butadiene styrene (ABS) resin. Thus, the bicycle hub cover assembly 141 provides a hard, rigid protective cover for ends of the bicycle hub 140.

The first and second hub end covers 151 and 152 have a centrally located mounting hole 171 that receives the fastener 153 for attaching first and second hub end covers 151 and 152 to the hub axle 142. In particular, the fasteners 153 are preferably screws with an internally threaded bore 153a. The fasteners 153 are inserted through the mounting holes 171 of the first and second hub end covers 151 and 152, and then are threaded onto the threaded end portions 142a of the hub axle 142.

Each of the first and second hub end covers 151 and 152 are also preferably provided with an axially extending abutment wall 172 that at least partially defines the mounting hole 171. The abutment wall 172 is configured to engage the end of the front fork 16 to provide the desired gap or spacing between the hub end covers 151 and 152 and the hub shell 143. The first and second hub end covers 151 and 152 have a peripheral edge 173 that is substantially circular, except for a frame receiving opening or notch 174 formed therein. In other words, the peripheral edges 173 of the first and second hub end covers 151 and 152 match the free end edges of the hub shell 143 when the bicycle hub cover assembly 141 is installed on the bicycle hub 140. The overall shapes of the first and second hub end covers 151 and 152 are the same as the first and second hub end covers 51 and 52 shown in FIGS. 17-19.

Referring now to FIGS. 23-28, the rear bicycle hub assembly 32 in accordance with the present invention will now be explained. In view of the similarity between the front bicycle hub assembly 22 and the rear bicycle hub assembly 32, the parts of the rear bicycle hub assembly 32 that are identical or substantially identical to the parts of the front bicycle hub assembly 22 will be only briefly described for the sake of brevity.

Basically, the rear hub assembly 32 includes a rear bicycle hub 90 and a rear bicycle hub cover assembly 91. The rear bicycle hub 90 in this embodiment is a relatively conventional internally geared hub that has been slightly modified such that the bicycle hub cover assembly 91 can be mounted thereto. Thus, the following description will mainly focus on the modifications of the bicycle hub 90 and the structure of the bicycle hub cover assembly 91.

The bicycle hub 90 basically includes a hub axle 92 and a hub shell 93 that is rotatably mounted on the hub axle 92 by a pair of bearing units (not shown) in a conventional manner. Each end of the hub axle 92 has an axially extending threaded hole 92a for attaching a bicycle part of the bicycle hub cover assembly 91 thereto.

The bicycle hub cover assembly 91 basically includes a first hub end cover 95 and a second hub end cover 96 with the first and second end covers 95 and 96 being fastened to the hub axle 92 via a pair of fasteners or screws 97. Basically, the first hub end cover 95 is substantially identical to the second hub end cover 96 discussed above except for the outer peripheral shape has been slightly modified.

The first hub end cover 95 has a similar configuration to the hub end covers 51 and 52, while second hub end cover 96 has been made to be integrally formed with a chain guard G. Accordingly, the second hub end cover 96 is constructed in a similar manner to the hub end covers 51 and 52 as discussed above, except for the integral chain guard G. Regarding the hub shell 93, the hub shell end edges are provided with spoke openings or cutouts 93a that accommodate tangentially arranged spokes 34 as seen in FIG. 1. Similar to the front bicycle hub assembly 122, the hub shell 93 has an outer peripheral surface that substantially matches the outer peripheral surfaces of the first and second hub end covers 95 and 96 to provide an integrated look.

The first and second hub end covers 95 and 96 each have a centrally located mounting hole that receives the fasteners 97 for attaching the first and second hub end covers 95 and 96 to the hub axle 92. In particular, the fasteners 97 are preferably screws that are inserted through the mounting holes 98 of the first and second hub end covers 95 and 96, and then are threaded into the threaded holes 92a formed at the free ends of the hub axle 92.

Each of the first and second hub end covers 95 and 96 are also preferably provided with an axially extending abutment wall 99 that is circumferentially arranged about the mounting hole 98. Thus, the abutment wall 99 is disposed radially outwardly of the mounting hole 98. The abutment wall 99 is sized for accommodating the end of the hub axle 42. Also, the abutment wall 99 is configured to engage the end of the frame 14 to provide the desired gap or spacing between the hub end covers 95 and 96 and the hub shell 93. The first and second hub end covers 95 and 96 have a peripheral edge 100 that is substantially circular, except for a frame receiving opening or notch 101 formed on the first hub end cover 95. In other words, the peripheral edges 100 of the first and second hub end covers 95 and 96 match the free end edges of the hub shell 93 when the bicycle hub cover assembly 91 is installed on the bicycle hub 90.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub assembly comprising:
   a hub axle;
   a hub shell mounted on the hub axle such that the hub shell rotates about the hub axle around a rotation axis, the hub shell including first and second axially spaced spoke mounting portions that are arranged and configured to have a plurality of spokes attached thereto, a radially outer most surface of the hub shell defining a radially outer most surface of the bicycle hub assembly along the hub shell;
   a first hub end cover having a first mounting hole; and
   a first fastener extending through the first mounting hole of the first hub end cover and attached to a first end of the hub axle by direct engagement with the first end of the hub axle,
   the first hub end cover having a first peripheral edge and the hub shell having a first end portion with a first free end edge that generally matches the first peripheral edge of the first hub end cover,
   the radially outer most surface of the hub shell facing substantially radially outwardly and being located radially closer to the rotation axis than the first free end edge of the first end portion of the hub shell along a majority of an axial length of the hub shell.

2. The bicycle hub assembly according to claim 1, wherein the first hub end cover has a frame receiving opening.

3. A bicycle hub assembly comprising:
   a hub axle;
   a hub shell mounted on the hub axle such that the hub shell rotates about the hub axle, the hub shell including first and second axially spaced spoke mounting portions that are arranged and configured to have a plurality of spokes attached thereto;
   a first hub end cover having a first mounting hole and a frame receiving opening; and
   a first fastener extending through the first mounting hole of the first hub end cover and attached to a first end of the hub axle,
   the first hub end cover having a first peripheral edge and the hub shell having a first end portion with a first free end edge that generally matches the first peripheral edge of the first hub end cover, the first hub end cover being bowl shaped with the first peripheral edge defining the frame receiving opening.

4. The bicycle hub assembly according to claim 1, wherein the first hub end cover is constructed of an acrylonitrile butadiene styrene (ABS) resin.

5. A bicycle hub assembly comprising:
   a hub axle;
   a hub shell mounted on the hub axle such that the hub shell rotates about the hub axle, the hub shell including first and second axially spaced spoke mounting portions that are arranged and configured to have a plurality of spokes attached thereto, a radially outer most surface of the hub shell defining a radially outer most surface of the bicycle hub assembly along the hub shell;
   a first hub end cover having a first mounting hole; and
   a first fastener extending through the first mounting hole of the first hub end cover and attached to a first end of the hub axle by direct engagement with the first end of the hub axle,
   the first hub end cover having a first peripheral edge and the hub shell having a first end portion with a first free end edge that generally matches the first peripheral edge of the first hub end cover,
   the first hub end cover including an axially extending abutment wall disposed radially outwardly from the first mounting hole.

6. The bicycle hub assembly according to claim 5, wherein the abutment wall is annularly arranged about the first mounting hole.

7. The bicycle hub assembly according to claim 1, further comprising
   a second hub end cover having a second mounting hole; and
   a second fastener extending through the second mounting hole of the second hub end cover and attached to a second end of the hub axle,
   the second hub end cover having a second peripheral edge and the hub shell having a second end portion with a second free end edge that generally matches the second peripheral edge of the second hub end cover.

8. The bicycle hub assembly according to claim 1, wherein
   the hub shell includes an outer surface extending along an axial length of the hub shell, the outer surface of the hub shell forming an outermost surface of the hub assembly along the axial length of the hub shell.

9. The bicycle hub assembly according to claim 8, wherein
   the outer surface of the hub shell includes first and second tapered sections that taper radially outwardly as the first and second tapered sections extend in axially opposite directions.

10. The bicycle hub assembly according to claim 8, further comprising
    a dynamo having a magnet and a stator that is electric-generating when the stator and magnet rotate relative to each other.

11. The bicycle hub assembly according to claim 10, wherein
    one of the stator and the magnet is fixedly attached to the hub shell and the other of the stator and magnet is fixedly attached to the hub axle.

12. The bicycle hub assembly according to claim 1, wherein the hub shell includes first and second external tapered surface sections that taper radially outwardly as the first and second external tapered surface sections extend in axially opposite directions.

13. The bicycle hub assembly according to claim 1, further comprising a dynamo having a magnet and a stator that is electric-generating when the stator and magnet rotate relative to each other.

14. The bicycle hub assembly according to claim 13, wherein one of the stator and the magnet is fixedly attached to the hub shell and the other of the stator and magnet is fixedly attached to the hub axle.

15. The bicycle hub assembly according to claim 5, wherein the hub shell has a substantially symmetrical external shape relative to a center plane that is perpendicular to the hub axle and the hub shell.

16. The bicycle hub assembly according to claim 1, wherein the hub shell has a substantially symmetrical external shape relative to a center plane that is perpendicular to the hub axle and the hub shell.

17. The bicycle hub assembly according to claim 3, wherein the hub shell has a substantially symmetrical external shape relative to a center plane that is perpendicular to the hub axle and the hub shell.

* * * * *